United States Patent
Suryanarayana et al.

(10) Patent No.: US 10,482,257 B2
(45) Date of Patent: Nov. 19, 2019

(54) SYSTEM AND METHOD TO ENFORCE THE SECURE BOOT POLICY OF A PLATFORM ON A VIRTUAL MACHINE

(71) Applicant: DELL PRODUCTS, L.P., Round Rock, TX (US)

(72) Inventors: Shekar Babu Suryanarayana, Bangalore (IN); Sumanth Vidyadhara, Bangalore (IN); Chandrasekhar Puthillathe, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 111 days.

(21) Appl. No.: 15/460,501

(22) Filed: Mar. 16, 2017

(65) Prior Publication Data

US 2018/0268146 A1 Sep. 20, 2018

(51) Int. Cl.
| | | |
|---|---|---|
| *G06F 9/455* | (2018.01) | |
| *G06F 21/57* | (2013.01) | |
| *G06F 21/44* | (2013.01) | |
| *G06F 21/33* | (2013.01) | |

(52) U.S. Cl.
CPC ........ *G06F 21/575* (2013.01); *G06F 9/45558* (2013.01); *G06F 21/33* (2013.01); *G06F 21/445* (2013.01); *G06F 2009/45583* (2013.01); *G06F 2009/45587* (2013.01)

(58) Field of Classification Search
CPC .... G06F 21/575; G06F 9/45558; G06F 21/33; G06F 21/445; G06F 2009/45583; G06F 2009/45587
See application file for complete search history.

(56) References Cited

U.S. PATENT DOCUMENTS

| | | | |
|---|---|---|---|
| 9,225,696 B2 * | 12/2015 | Pascariello | G06F 21/6218 |
| 2005/0138370 A1 * | 6/2005 | Goud | G06F 21/53 |
| | | | 713/164 |
| 2016/0210457 A1 | 7/2016 | Cleeton et al. | |

* cited by examiner

*Primary Examiner* — Austin Hicks
(74) *Attorney, Agent, or Firm* — Isidore PLLC

(57) ABSTRACT

A method to enforce secure boot policy in an IHS configured with a plurality of virtual machines. The method includes detecting a request for a virtual machine to access a service processor. In response to detecting the request, the method includes triggering a handshake request between a hypervisor boot emulator and the service processor to initiate a sequence of authentication steps to access a corresponding secure partition of memory from among a plurality of secure partitions of memory associated with the service processor. Each secure partition of memory has a corresponding virtual platform key for preserving secure access to the corresponding secure partition of memory stored in a secure platform. The method further includes dynamically generating unlock keys, derived in part by the corresponding virtual platform key, to authenticate a requesting virtual machine as a valid virtual machine to obtain access to a corresponding secure partition of memory.

20 Claims, 5 Drawing Sheets

SYSTEM AND METHOD TO ENFORCE THE SECURE BOOT POLICY OF A PLATFORM ON A VIRTUAL MACHINE

BACKGROUND

1. Technical Field

The present disclosure generally relates to security of information handling systems (IHSs) and in particular to secure boot in IHSs.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many conventional information handling systems utilize secure boot technology, where the firmware of the system checks that the system boot is digitally signed with a cryptographic key, authorized by a database contained in the firmware. Verifying digital signatures of software components ensures the authenticity and integrity of the software component. Some commercial operating systems include built-in support for verifying the digital signature of software components. Unfortunately, this verification support is not always enabled in those operating systems, and in some instances, can be explicitly disabled to further compromise an operating system.

Often verification of a digital signature occurs internally within a virtual machine. A guest operating system, operating on the virtual machine, verifies the software component which the guest operating system has loaded, in a form of self-verification by the guest operating system. However, the method of self-verification is susceptible to tampering and/or system attacks. For example, the virtual machine operating system digital signature verification system may be disabled. In another example, the virtual machine guest operating system's digital signature verification occurs, but is later tampered with after the guest operating system's signature verification is complete. The side effects of these breaches in security may cause a crash of the hypervisor, host memory corruption, and unpermitted hypervisor file system access from within the virtual machine. The side effects of a host system's security breach via a virtual machine is undesirable and could potentially be irreversible.

BRIEF SUMMARY

Disclosed are an information handling system (IHS) and a method to enforce secure boot policy in the IHS configured with a plurality of virtual machines. The method includes detecting, at a hypervisor boot emulator, a request for a virtual machine of the plurality of virtual machines to access a service processor. The method then includes, in response to detecting the request, triggering a handshake request between the hypervisor boot emulator and the service processor to initiate a sequence of authentication steps. The authentication steps are performed to access a corresponding secure partition of memory from among a plurality of secure partitions of memory. The secure partitions of memory are associated with the service processor. Each secure partition of memory has a corresponding virtual platform key. The virtual platform key is provided/utilized to preserve secure access to the corresponding secure partition of memory stored in a secure platform associated with the service processor. The method further includes dynamically generating unlock keys. The dynamically generated unlock keys are derived in part by the corresponding virtual platform key. The dynamically generated unlock keys authenticate a requesting virtual machine as a valid virtual machine to obtain access to a corresponding secure partition of memory.

According to another embodiment, the method includes creating at least one partition of memory in a secure platform having accessibility via a platform key. The method then includes dynamically generating a unique virtual platform key for each corresponding partition of memory. The method further includes selectively assigning the unique virtual platform key to individually secure each corresponding partition of memory, and signing each unique virtual platform key with the platform key.

According to yet another embodiment, the IHS includes a processor, a hypervisor, a service processor controlling access to at least one partition of memory, and a memory system communicatively coupled to the hypervisor. The memory has stored thereon a secure boot utility that executes on the processor to enable the hypervisor to detect, at a hypervisor boot emulator, a request for a virtual machine of a plurality of virtual machines to access a service processor. In response to detection of the request, the secure boot utility triggers a handshake request between the hypervisor boot emulator and the service processor to initiate a sequence of authentication steps to access a corresponding secure partition of memory from among a plurality of secure partitions of memory. The secure partitions of memory are associated with the service processor. Each secure partition of memory has a corresponding virtual platform key for preserving secure access to the corresponding secure partition of memory stored in a secure platform associated with the service processor. The secure boot utility dynamically generates unlock keys, derived in part by the corresponding virtual platform key, to authenticate a requesting virtual machine as a valid virtual machine. During the sequence of authentication steps, the dynamically generated unlock keys are compared to select portions of the virtual platform key and/or stored valid unlock keys. Successfully completing the sequence of authentication steps enables the virtual machine to access a corresponding secure partition of memory.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
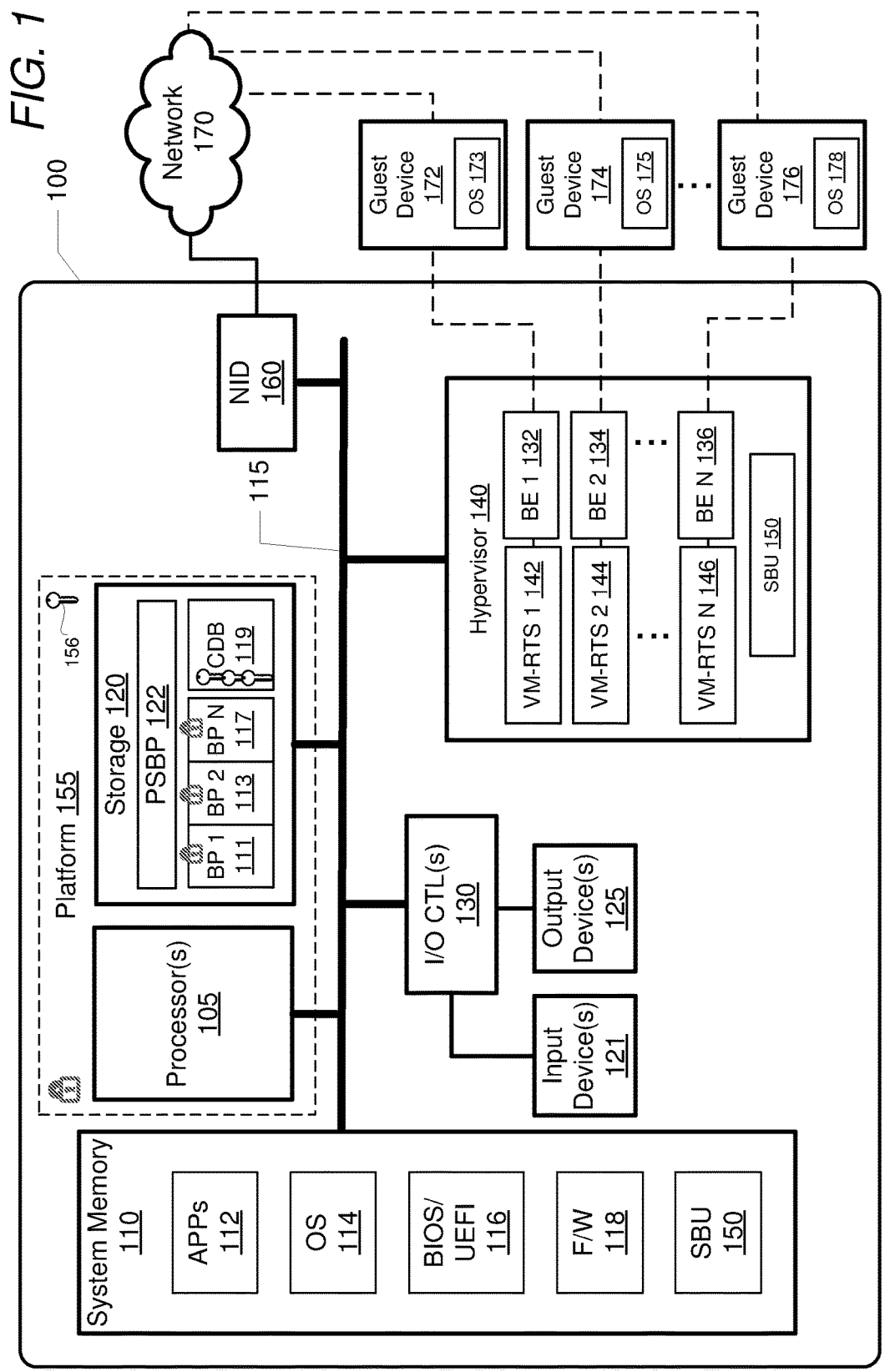
FIG. 1 illustrates an example information handling system within which various aspects of the disclosure can be implemented, according to one or more embodiments.

The illustrative embodiments provide an information handling system (IHS) and a method to enforce secure boot policy in an IHS configured with a plurality of virtual machines. The method includes detecting, at a hypervisor boot emulator, a request for a virtual machine of the plurality of virtual machines to access a service processor. In response to detecting the request, the method includes triggering a handshake request between the hypervisor boot emulator and the service processor to initiate a sequence of authentication steps to enable an authenticated virtual machine access to a corresponding secure partition of memory from among a plurality of secure partitions of memory associated with the service processor. Each secure partition of memory has a corresponding virtual platform key for preserving secure access to the corresponding secure partition of memory stored in a secure platform associated with the service processor. The method further includes, during a first virtual machine secure boot request, dynamically generating an unlock key for each step in a series of authentication steps. During the sequence of authentication steps, the method dynamically assigns the requesting virtual machine to a secure partition of memory. The dynamically generated unlock keys are stored in a secure key database. During a subsequent virtual machine secure boot request, the method determines whether there is a valid correlation between the detected virtual machine signature and the unlock keys stored in the secure database. A successful correlation between the signature of the virtual machine and stored unlock keys provides access to subsequent authentication steps. Authentication at each step in the sequence of steps enables the requesting virtual machine to access the corresponding secure partition of memory.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Those of ordinary skill in the art will appreciate that the hardware, firmware/software utility, and software components and basic configuration thereof depicted in the following figures may vary. For example, the illustrative components of IHS 100 are not intended to be exhaustive, but rather are representative to highlight some of the components that are utilized to implement certain of the described embodiments. For example, different configurations of an IHS may be provided, containing other devices/components, which may be used in addition to or in place of the hardware depicted, and may be differently configured. The depicted example is not meant to imply architectural or other limitations with respect to the presently described embodiments and/or the general invention.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 105 coupled to system memory 110 via system interconnect 115. System interconnect 115 can be interchangeably referred to as a system bus, in one or more embodiments. Also, coupled to system interconnect 115 is storage 120 within which can be stored one or more software and/or firmware modules and/or data. In this example, storage 120 stores platform secure boot partition (PSBP) module 122, boot partition 1 111, boot partition 2 113, boot partition N 117, and certificate database 119. Boot partition 1 111, boot partition 2 113, boot partition N 117 are individually secure boot partitions that correspond to a guest device (virtual machine). Each key to boot partition 1 111, boot partition 2 113, boot partition N 117 is stored in certificate database 119. Processor 105 and storage 120, in part or in whole, form secure platform 155. Secure platform 155 is accessible via platform key 156. In one embodiment, storage 120 can be a hard drive or a solid-state drive. For example, storage 120 can be non-volatile Random Access Memory (NVRAM) for storing the platform secure boot partitions (e.g. boot partition 1 111, boot partition 2 113, boot partition N 117). The one or more software and/or firmware modules within storage 120 can be loaded into system memory 110 and hypervisor 140 during select operations of IHS 100. As shown, system memory 110 can include therein a plurality of software and/or firmware modules, including application(s) 112, operating system (OS) 114, basic input/output system/unified extensible firmware interface (BIOS/UEFI) 116, other firmware (F/W) 118, as well as secure boot utility (SBU) 150. The various software and/or firmware modules have varying functionality when their corresponding program code is executed by processor(s) 105 or other processing devices within IHS 100. IHS 100 further includes one or more input/output (I/O) controllers 130 which support connection by, and processing of signals from, one or more connected input device(s) 121, such as a keyboard, mouse, touch screen, or microphone. I/O controllers 130 also support connection to and forwarding of output signals to one or more connected output devices 125, such as a monitor or display device or audio speaker(s).

IHS 100 further comprises a network interface device (NID) 160. NID 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. For example, guest device 172, guest device 174, and guest device 176 communicate with IHS 100 via network 170. In another embodiment, guest device 172, guest device 174, and guest device 176 communicate with IHS 100 via a connection to hypervisor 140. Guest device 172, guest device 174, and guest device 176 include OS 173, OS 175, and OS 178, respectively, as a software module. IHS 100 serves as the host machine to guest devices 172, 174, and 176. Network 170 can be a local area network, wide area network, personal area network, and the like, and the connection to and/or between network and IHS 100 can be wired or wireless or a combination thereof. For purposes of discussion, Network 170 is indicated as a single collective component for simplicity. However, it is appreciated that network 170 can comprise one or more direct connections to other devices as well as a more complex set of interconnections as can exist within a wide area network, such as the Internet.

Further, IHS 100 includes hypervisor 140. Hypervisor 140 is computer software, firmware, or hardware that creates, executes, and/or monitors virtual machines. Hypervisor 140 includes system boot utility (SBU) 150, boot emulator 1 132, boot emulator 2 134, and boot emulator N 136. Additionally, hypervisor 140 includes an interface that provides system calls between hypervisor 140 and platform 155. More specifically, in the illustrated embodiment, virtual machine runtime service (VM-RTS) 1 142, VM-RTS 2 144, and VM-RTS 2 146 provides these system calls. VM-RTS (142, 144, 146) provides access to a run-time service client interface, which creates a secure channel of operations to enable an authenticated guest device to access a corresponding boot partition (111, 113, 117) of memory. In an alternate embodiment, hypercalls are implemented to provide secure communication between hypervisor 140 and platform 155. Hypercalls are invoked to create a secure channel of operations that enable an authenticated guest device to access a corresponding boot partition (111, 113, 117) of memory. Additional aspects of secure boot utility 150 and functionality associated thereof are presented within the description of FIGS. 2-6.

Figure 2:
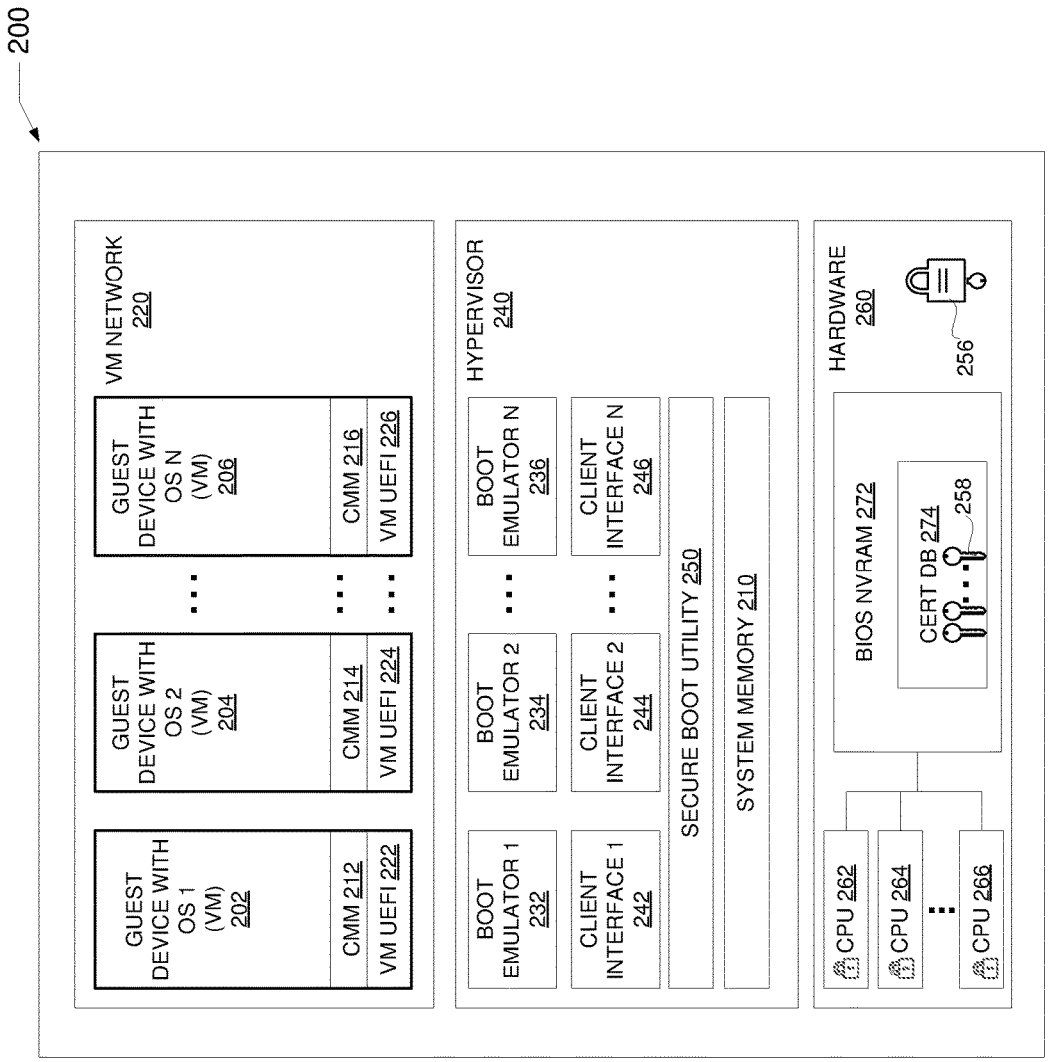
FIG. 2 illustrates example contents of a virtual machine and an information handling system security management architecture, in accordance with one embodiment.

With reference now to FIG. 2, there is illustrated example hardware and firmware/software components of FIG. 1 that are utilized within secure boot network 200 to implement a secure boot policy between hypervisor 240 and a plurality of virtual machines. Secure boot network 200 includes virtual machine (VM) network 220, hypervisor 240, and hardware 260.

VM network 220 includes guest device 1 with OS 1 202, guest device 2 with OS 2 204, and guest device N with OS N 206. Each guest device is a virtual machine that individually includes a certificate management module (CMM) and virtual machine (VM) UEFI. As illustrated, guest device 1 with OS 1 202 includes CMM 212 and VM UEFI 222, guest device 2 with OS 2 204 includes CMM 214 and VM UEFI 224, and guest device N with OS N 206 includes CMM 216 and VM UEFI 226.

Hypervisor 240 includes boot emulator 1 232, boot emulator 2 234, and boot emulator N 236. Additionally, hypervisor 240 includes client interface 1 242, client interface 2 244, and client interface N 246. Secure boot utility 250 and system memory 210 are accessible components to hypervisor 240. System memory 210 may include a signature database, for example CDB 119 of FIG. 1, for the verification of valid (or invalid) signatures. In one embodiment, each client interface 242, 244, and 246 is a virtual machine runtime service client interface. In another embodiment, each client interface 242, 244, and 246 is a hypercalls client interface.

Hardware 260 includes CPU 262, 264, and 266. Additionally, hardware 260 includes BIOS NVRAM 272, which stores certificate database 274, platform key 256, and virtual platform keys 258. Certificate database 274 is a credential database, storing the virtual platform keys, session identifications, digital certificate verification, dynamic keys, etc. Hardware 260, and the components thereof, is communicatively coupled to hypervisor 240.

In operation, hypervisor 240 and hardware 260 are a part of an IHS, for example IHS 100 that is equipped to serve as host to a plurality of virtual machines (e.g. guest device 202, 204, and 206). An original equipment manager (OEM) installs a platform key to secure hardware 260. Platform key 256 is a self-signing platform key. CPU 262, 264, and 266 are processors within hardware 260. CPU 262, 264, and 266 selectively execute firmware and/or software when a corresponding secure partition of memory is accessed. A unique virtual platform key 258 for each corresponding partition of memory is dynamically generated and stored within certificate database 274. In one embodiment, the unique virtual platform key is a combination of a uniquely generated identification and a select portion of a predecessor platform key. The unique virtual platform key is selectively assigned to individually secure software, firmware, data, and the like accessible via CPU 262, 264, and 266. Virtual platform keys 258 are signed by platform key 256, providing a correlation between platform key 256 and virtual platform keys 258. Virtual platform keys 258 are securely stored within certificate database 274 in BIOS NVRAM 272. Each secure partition of memory is selectively accessible via a corresponding virtual platform key 258, and each virtual platform key 258 is selectively accessible via a guest device (202, 204, and 206). Boot emulator (232, 234, and 236) respectively detects the guest OS/device (202, 204, and 206) triggering run-time client service to establish a secure boot channel between VM UEFI (222, 224, and 226) and the respective client interface (242, 244, and 246). During a first secure boot request, secure boot utility 250 dynamically assigns a guest OS/device to a secure partition of memory (262, 264, and 266). During at least one step of the sequence of authentication steps, a session identification is created that allocates a guest OS to the corresponding secure partition of memory. During subsequent secure boot requests from an authenticated guest OS (202, 204, and 206), run-time service client interface 246 dynamically selects the corresponding secure partition of memory according to the detected session identification.

In one embodiment, guest device 202, 204, and 206 are virtual machines requesting access to firmware and/or software securely stored on hardware 260. The guest device (202, 204, 206) is assigned a boot emulator (232, 234, 236). In this example, guest device 202 is assigned boot emulator 232. Secure boot utility 250 detects the request of boot emulator 232 to access a secure partition of memory associated with hardware 260. Secure boot utility 250 triggers a secure handshake between boot emulator 232 and client interface 242 to initiate a sequence of authentication steps for guest device 202 to access a corresponding secure partition of memory from among a plurality of secure partitions of memory associated with hardware 260. The secure handshake provides a decoded hash index of the virtual platform key to boot emulator 232 and establishes a policy to access virtual platform keys within the secure partition of memory that correspond respectively to the requesting guest device(s). In one embodiment, unlock keys are dynamically generated as a derivative in part (or in whole) of the corresponding virtual platform key. Secure boot utility 250 enables hypervisor 240 to store the valid unlock key in a valid signature database. The corresponding virtual platform key, also a derivative of the predecessor platform key, enables a requesting virtual machine to selectively obtain access to a corresponding secure partition of memory.

In response to detecting the handshake request, the corresponding client interface 242 validates a signature associated with the requesting virtual machine, guest device 202, by receiving a boot signature from guest device 202. A number of validation methods may be utilized to authenticate the signature associated with guest device 202. In one embodiment, client interface 242 authenticates guest devices that enforce security, i.e., virtual machines that are only executing programs that are securely signed. In another embodiment, client interface 242 compares at least a portion of the boot signature to at least one secure signature of a plurality of secure signatures stored in a valid signature database. In response to the boot signature matching a secure signature, secure boot utility 250 dynamically generates a valid unlock key, and assigns the valid unlock key to guest device 202, and dynamically assigns guest device 202 to a secure partition of memory. To form an encoded hash index unlock key, the valid unlock key is generated in part or in whole from one or more of: (i) an encoded virtual platform key, (ii) a unique signature, and (iii) a hash of a virtual machine boot signature.

In a next authentication step, a determination must be made as to whether an unlock key provided by guest device 202 to client interface 242 is a valid unlock key. Client interface 242 receives the unlock key. Client interface 242 decodes the unlock key (i) to determine if the unlock key is a valid hash index and (ii) to identify the corresponding secure partitions of memory. Client interface 242 compares at least a portion of the unlock key to the corresponding virtual platform key 258. In response to determining that at least the portion of the unlock key correlates to virtual platform key in a corresponding partition of memory, client interface 242 dynamically generates a valid session identification. The valid session identification is stored on a valid signature database. The valid session identification enables secure boot utility 250 to assign guest device 202 to client interface 242. Forming a relationship between guest device 202 and client interface 242 using the valid session identification enables boot emulator 232 to dynamically authenticate a requesting virtual machine and identify the corresponding client interface. Therefore, secure boot utility 250 dynamically detects the valid session identification during subsequent virtual machine operating system boot request to execute a secure boot or access a secure partition of memory. The assignment of the requesting guest device (virtual machine) to the corresponding runtime service client interface is dynamically authenticated during subsequent request to access the service processor.

In a next authentication step, a session identification is received at hypervisor boot emulator 232 in response to a virtual machine operating system boot request. Secure boot utility 250 compares at least a select portion of the session identification to a valid session identification stored in the valid signature database. In response to at least the select portion of the session identification being associated with the valid session identification, secure boot utility 250 receives a signed certificate from the hypervisor boot emulator (232) that corresponds to the valid security credentials of guest device 202. The signed certificate is compared to at least one valid signed certificate stored in a valid signed certificate database and is associated with the corresponding secure partition of memory that guest device is requesting to access. In response to the signed certificate matching the at least one valid signed certificate, secure boot utility 250 enables secure boot of guest device 202 with access to the corresponding secure partition of memory.

In one embodiment, subsequent unlock keys are generated to secure at least one database stored in the at least one partition of memory. At any one step in the sequence of steps, the unlock key is one or more of a valid signature, a valid session identification, and a valid certificate. In one embodiment, at least a portion of the unlock key is formed using a derivative of virtual platform key 258. In response to the requesting virtual machine (i) successfully providing a corresponding unlock key to the respective hypervisor boot emulator and (ii) obtaining validation at each of the sequence of authentication steps, the requesting guest device (202, 204, 206) is enabled to execute secure boot. Also, the requesting guest device (202, 204, 206) is provided access to the corresponding, requested secure partition of memory. In response to invalidation of the unlock key at any one of the sequence of authentication steps, the requesting virtual machine (202, 204, 206) is denied access to the plurality of secure partitions of memory.

Figure 3:
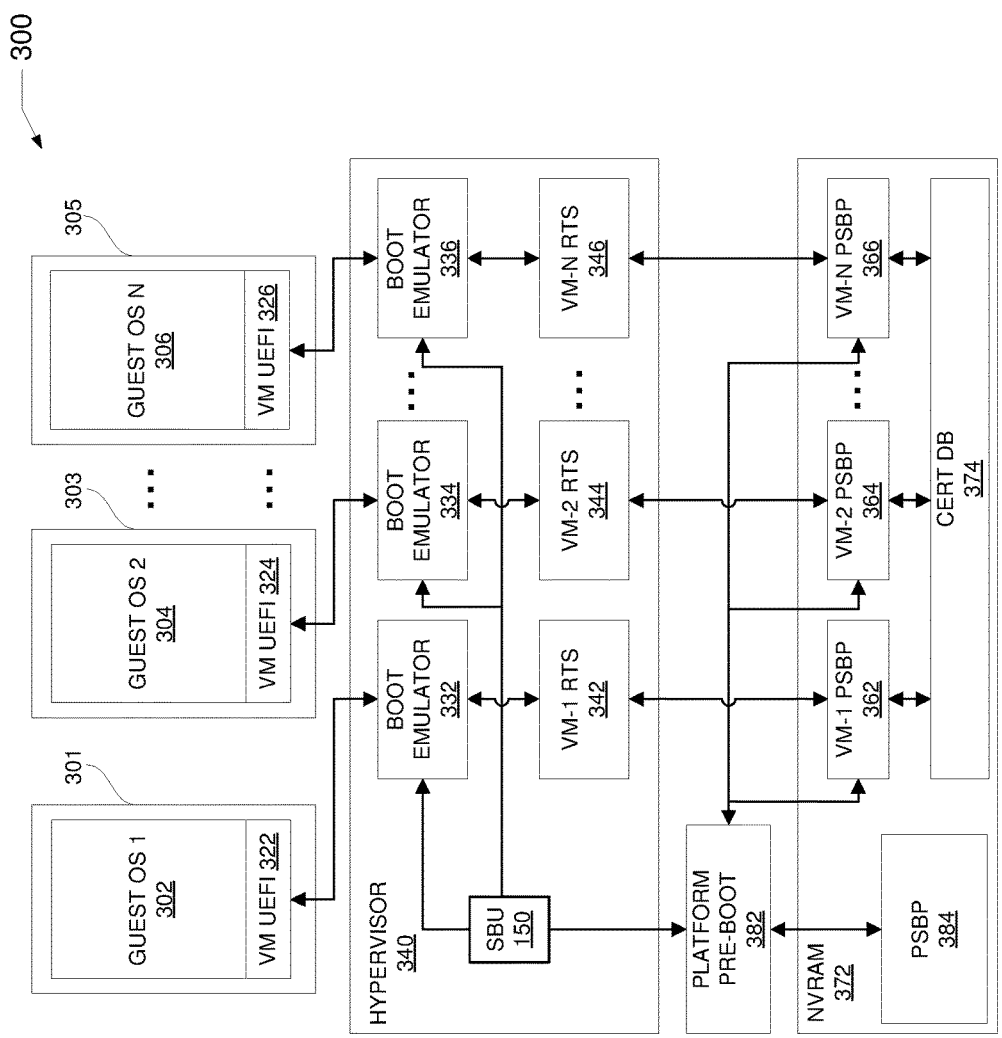
FIG. 3 is a diagram illustrating a firmware interface between a virtual machine and an information handling system having a virtual machine secure boot architecture, in accordance with one embodiment.

FIG. 3 illustrates secure boot network 300 providing a firmware interface between a virtual machine and an information handling system having a virtual machine secure boot architecture. Secure boot network 300 includes virtual machine 1 (with OS 1 302) 301, virtual machine 2 (with OS 2 304) 303, and virtual machine 3 (with OS 3 306) 305. Virtual machines 301, 303, and 305 include virtual machine UEFI (VM UEFI) 322, 324, and 326 respectively. Additionally, secure boot network includes hypervisor 340, platform pre-boot 382, and NVRAM 374.

Hypervisor 340 includes secure boot utility 150, VM-RTS 342, 344, and 346, as well as boot emulator 332, 334, and 336. Boot emulator 332, 334, and 336 respectively connect to VM-RTS 342, 344, and 346. NVRAM 372 includes PSBP module 384, VM-1 PSBP 362, VM-2 PSBP 364, and VM-N PSBP 366, each connected to certificate database 374.

In one embodiment, PSBP module 384 enables selective syncing of virtual platform keys to a corresponding VM PSBP 362, 364, and/or 366. VMs 301, 303, and 305 are each assigned a corresponding VM PSBP in NVRAM 372. Specifically, VM 301 is assigned VM-1 PSBP 362, VM-2 303 is assigned VM-2 PSBP 364, and VM-N 305 is assigned VM-N PSBP 366. In one embodiment, each key is formed, at least in part, using a GUID or UUID as a form of a unique identification as defined by the platform vendor which imbeds the plurality of keys in NVRAM 372.

In one embodiment, one of a runtime service and a hypercall is implemented to initiate the sequence of authentication steps to access the corresponding secure partition of memory. The runtime service and the hypercall are each a Unified Extensible Firmware Interface (UEFI) runtime service, established in a hypervisor. The runtime service and hypercall form an association between a platform key and each of the corresponding virtual platform keys. Each of the corresponding virtual platform keys is signed by the platform key. The platform key secures the platform (i.e. NVRAM 372) which stores the secure partitions of memory, for example, VM PSBP 362, 364, and 366. Hypercalls enable hypervisor 340 to make system calls to access certificate database 374 in hardware, and allows hypervisor 340 to read the platform key and/or plurality of virtual platform keys stored in VM PSBP 362, 364, and/or 366. Implementing a read of the virtual platform keys associated with VM PSBP 362, 364, and/or 366 enables hypervisor 340 to generate secure credentials that are at least formed in part using the unique identity of the virtual platform keys.

In another embodiment, authentication and secure boot is required for each virtual machine 301, 303, and 305 to access a corresponding secure partition of memory, VM-1 PSBP 362, VM-2 PSBP 364, VM-N PSBP 366. VM UEFI 322, 324, and 326 are included within respective VM 301, 303, and 305. VM UEFI 322, 324, and 326 communicatively couples to corresponding boot emulator 332, 334, and 336 within hypervisor 340. Hypervisor 340 implements read-access to enable VM-RTS 342, 344, and/or 346 to read certificate database and retrieve a corresponding virtual platform key for each detected virtual machine. According to one aspect, only hypervisor 340 can access certificate database. Hypervisor 340 accesses certificate database via a corresponding run time service client interface of VM-RTS 342, 344, and/or 346. In one example a request is sent for VM-1 RTS 342 to retrieve the virtual platform key for VM-1 301. More specifically, the request is made to the client interface of VM-1 RTS 342, which is communicatively coupled to certificate database 374 within NVRAM 372 via VM-1 PSBP 362. When secure boot is implemented at VM UEFI 322, VM 301 attempts to retrieve the corresponding virtual platform key within VM-1 PSBP 362. However, the guest OS of VM-1 301 does not gain access to certificate database 374. Instead, VM UEFI 322 reads and verifies that security credentials of VM 301 are signed. Boot emulator 332, 334, and/or 336 calls VM-RTS client interface (e.g. 244 of FIG. 2) to determine if the virtual machine boot is signed or not signed with respect to authentication at a corresponding memory partition, VM PSBP 362, 364, and/or 366, within NVRAM 372. Hypervisor VM-1 RTS 342 intercepts the request and implements authentication steps to validate access to VM-1 PSBP 362. The authenticated access to VM-1 PSBP 362 provides access to secure database, firmware, software, etc., associated with certificate database 374.

In another embodiment, VM-RTS 342, 344, and 346 are replaced with a hypercall at the hypervisor. VM UEFI 322, 324, and/or 326 provides a request to the hypercall to enable access to certificate database 374. In response to authentication of the requesting virtual machine, the hypercall invokes a system call via the UEFI associated with VM-PSBP 362, 364, and 366 to selectively access virtual platform keys stored in VM-PSBP 362, 364, and/or 366.

Figure 4:
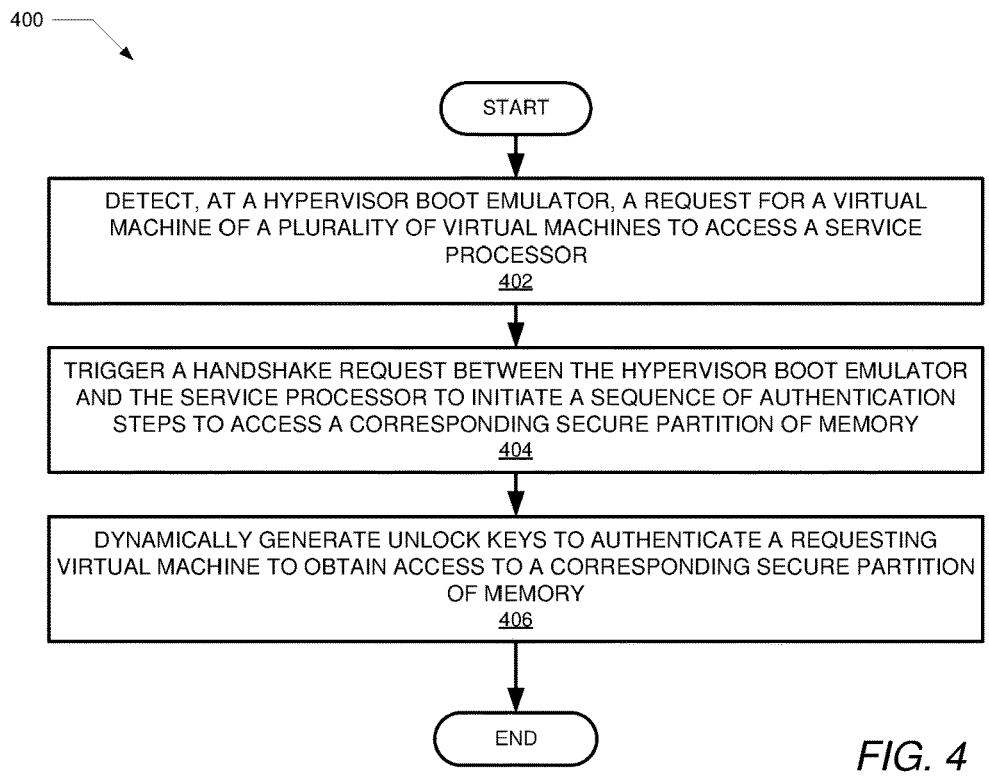
FIG. 4 is a flow chart illustrating an example of a method to enforce a secure boot policy in an information handling system configured with a plurality of virtual machines, in accordance with one embodiment.
Figure 5:
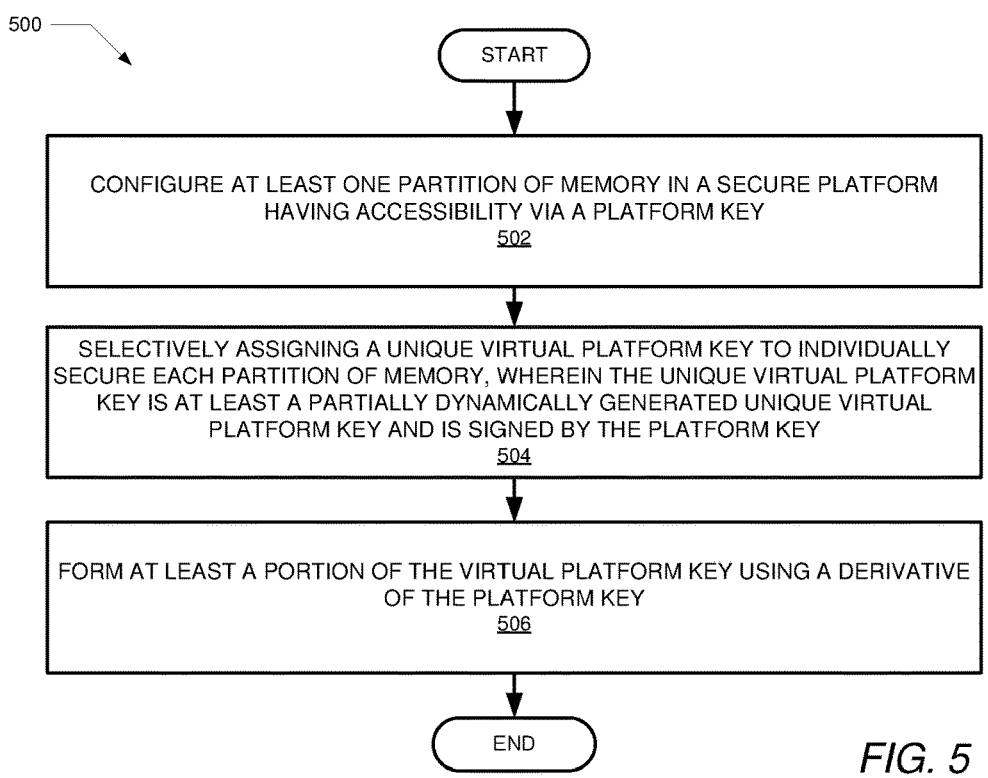
FIG. 5 is a flow chart illustrating an example of a method for selectively assigning a unique virtual platform key to each virtual machine of a plurality of virtual machines to enforce the secure boot policy, according to one or more embodiments.
Figure 6:
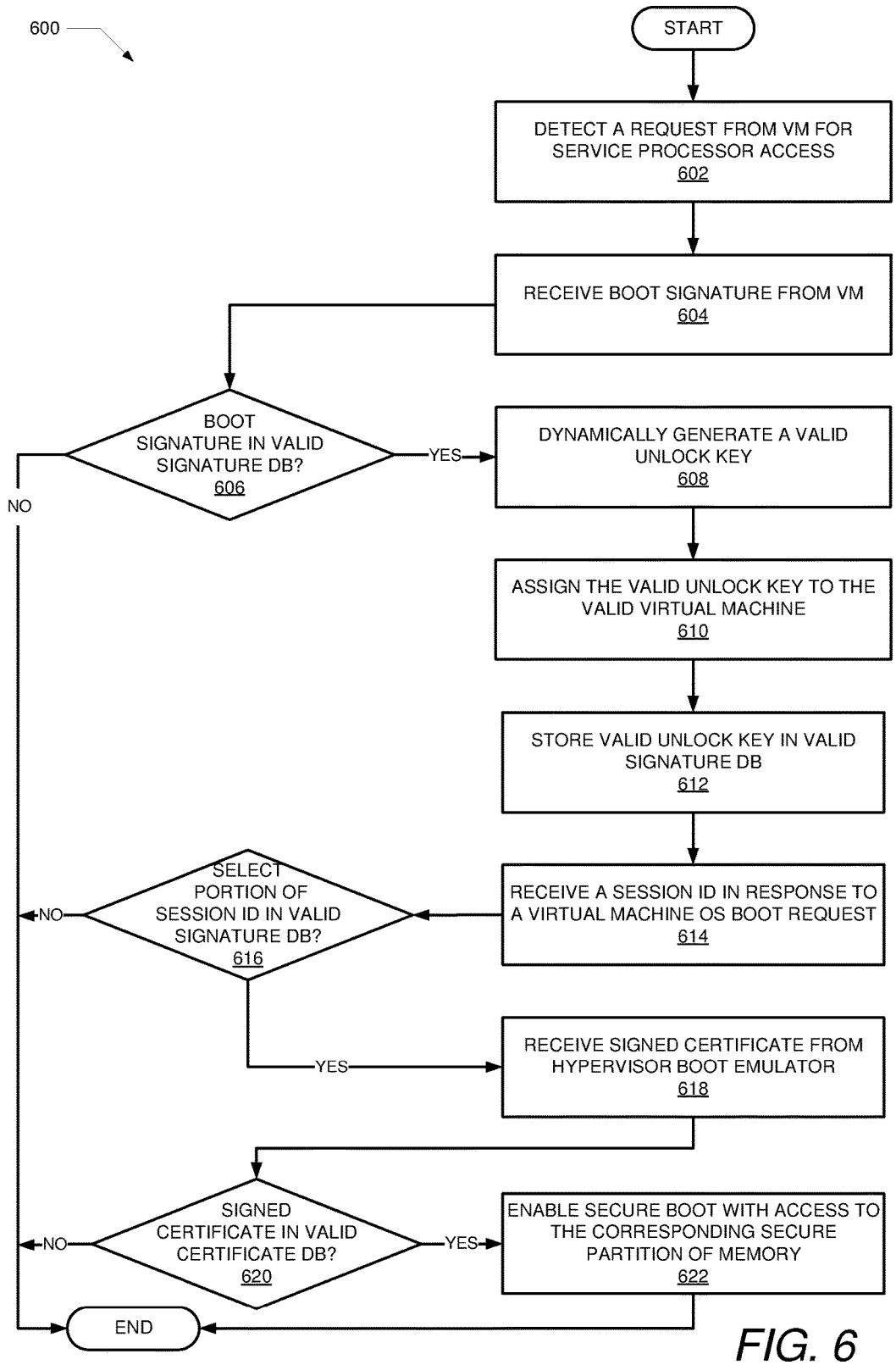
FIG. 6 is a flow chart illustrating example of a method for enforcing a secure boot policy to authenticate a virtual machine according to one or more embodiments.

FIGS. 4, 5, and 6 illustrate flowcharts of exemplary methods 400, 500, and 600 by which processor 105 and secure boot utility 150 within the preceding figures performs different aspects of the processes that enable the one or more embodiments of the disclosure. Generally, method 400 is a method to enforce secure boot policy in an information handling system. FIG. 5 is a method for selectively assigning a unique virtual platform key to each virtual machine of a plurality of virtual machines to enforce the secure boot policy. FIG. 6 is a method for enforcing secure boot policy to authenticate a virtual machine.

The description of methods 400, 500, and 600 are provided with general reference to the specific components illustrated within the preceding FIGS. 1-3. Generally, methods 500 and 600 are described as being implemented via hypervisor 140 and particularly the execution of code provided by secure boot utility 150. It is however appreciated that certain aspects of the described methods may be implemented via other processing devices and/or execution of other code.

Referring now to FIG. 4, method 400 begins at the start block and proceeds to block 402 where method 400 includes detecting, at a hypervisor boot emulator, a request for a virtual machine of a plurality of virtual machines to access a service processor. Method 400 proceeds to block 404, at which secure boot utility 150 triggers a handshake request between the hypervisor boot emulator and the service processor to initiate a sequence of authentication steps to access a corresponding secure partition of memory. Following the triggering of the handshake, method 400 includes dynamically generating unlock keys to authenticate a requesting virtual machine to obtain access to a corresponding secure partition of memory, at block 406. The method concludes at the end block.

The method of FIG. 5 begins at the start block and proceeds to block 502, where the method includes configuring at least one partition of memory in a secure platform having accessibility via a platform key. Method 500 proceeds to block 504, at which secure boot utility 150 selectively assigns a unique virtual platform key to individually secure each partition of memory. The unique virtual platform key is at least a partially dynamically generated unique virtual platform key, and is signed by the platform key. Secure boot utility 150 forms at least a portion of the virtual platform key using a derivative of the platform key, at block 506. The method concludes at the end block.

Turning now to FIG. 6, method 600 begins at the start block and proceeds to block 602. At block 602, method includes detecting a request from a virtual machine for service processor access. Method 600 proceeds to block 604, at which secure boot utility 150 receives a boot signature from the virtual machine. At decision block 606, a determination is made whether the received boot signature is in a valid signature database (in whole or in part). In response to the boot signature being in the valid signature database, secure boot utility 150 dynamically generates a valid unlock key (block 608) and the process moves to block 610. In response to the boot signature not being in the valid signature database, the process ends. At block 610, method 600 includes assigning the valid unlock key to the valid virtual machine. Method 600 includes storing the valid unlock key in the valid signature database, at block 612. Method 600 includes receiving a session identification in response to a virtual machine operating system boot request (block 614). At decision block 616, a determination is made whether a select portion of the session identification is in the valid signature database. In response to a select portion of the session identification not being in the valid signature database, the process ends.

In response to a select portion of the session identification being in the valid signature database, the process continues to block 618. At block 618, method 600 includes receiving a signed certificate from the hypervisor boot emulator. A determination is made, at decision block 620, whether the received signed certificate is in a valid certificate database. In response to the signed certificate not being in a valid certificate database, the method ends. In response to the signed certificate being in a valid certificate database, method 600 includes enabling secure boot with access to the corresponding secure partition of memory, at block 622. The method concludes at the end block.

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method to enforce a secure boot policy in an information handling system (IHS) configured with a plurality of virtual machines, the method comprising:
   detecting, at a hypervisor boot emulator, a request for a virtual machine of the plurality of virtual machines to access a service processor;
   in response to detecting the request, triggering a handshake request between the hypervisor boot emulator and the service processor to initiate a sequence of authentication steps to access a corresponding secure partition of memory from among a plurality of secure partitions of memory associated with the service processor, each secure partition of memory having a corresponding virtual platform key for preserving secure access to the corresponding secure partition of memory stored in a secure platform associated with the service processor; and
   dynamically generating unlock keys, following authentication of a boot signature of the virtual machine, the unlock keys generated to authenticate a requesting virtual machine as a valid virtual machine to obtain access to a corresponding secure partition of memory.

2. The method of claim 1, further comprising:
   in response to the requesting virtual machine successfully providing a corresponding unlock key to the hypervisor boot emulator and obtaining validation at each of the sequence of authentication steps, providing access to the corresponding secure partition of memory subsequent to a valid virtual machine successfully obtaining validation at each step of the sequence of authentication steps; and
   denying access by the requesting virtual machine to the plurality of secure partitions of memory in response to invalidation of the unlock key at any one of the sequence of authentication steps.

3. The method of claim 1, wherein the sequence of authentication steps further comprises:
   in response to detecting the handshake request, receiving the boot signature from the virtual machine;
   comparing the boot signature to at least one secure signature of a plurality of secure signatures stored in a valid signature database;
   in response to the boot signature matching a secure signature, dynamically generating a valid unlock key; and
   assigning the valid unlock key to the valid virtual machine.

4. The method of claim 3, further comprising:
   storing the valid unlock key in the valid signature database, the valid unlock key being one of a mixed set of keys, a unique signature, and a hash of a virtual machine boot signature.
5. The method of claim 1, wherein the sequence of authentication steps further comprises:
   assigning a corresponding runtime service client interface to the hypervisor boot emulator in communication with the requesting virtual machine;
   receiving, at the corresponding runtime service client interface, an unlock key;
   comparing at least a portion of the unlock key to the corresponding virtual platform key;
   in response to determining that at least the portion of the unlock key corresponds to the corresponding virtual platform key, dynamically generating a valid session identification that assigns the requesting virtual machine to the corresponding runtime service client interface; and
   storing the valid session identification on a valid signature database.
6. The method of claim 5, further comprises:
   detecting the valid session identification of the requesting virtual machine, at the hypervisor boot emulator, during a subsequent virtual machine operating system boot request; and
   dynamically authenticating an assignment of the requesting virtual machine to the corresponding runtime service client interface.
7. The method of claim 1, wherein the sequence of authentication steps further comprises:
   receiving a session identification at the hypervisor boot emulator in response to a virtual machine operating system boot request;
   comparing at least a select portion of the session identification to a valid session identification stored in the valid signature database;
   in response to at least the select portion of the session identification being associated with the valid session identification, receiving a signed certificate from the hypervisor boot emulator;
   comparing the received signed certificate to at least one valid signed certificate stored in a valid signed certificate database associated with the corresponding secure partition of memory; and
   enabling secure boot with access to the corresponding secure partition of memory in response to the signed certificate matching the at least one valid signed certificate.
8. The method of claim 1, further comprising:
   implementing one of a runtime service and a hypercall to initiate the sequence of authentication steps to access the corresponding secure partition of memory, wherein the runtime service and the hypercall are each a Unified Extensible Firmware Interface (UEFI) runtime service established in a hypervisor that forms an association between a platform key and each of the corresponding virtual platform keys.
9. The method of claim 8, wherein each of the corresponding virtual platform keys is signed by the platform key, wherein the platform key secures the platform storing the secure partitions of memory.
10. The method of claim 8, further comprises storing at least a portion of the corresponding virtual platform keys in the valid signature database.
11. A method in an information handling system (IHS) for:
    storing at least one partition of memory in a secure platform having accessibility via a platform key; and
    at least in part, dynamically generating a unique virtual platform key for each corresponding partition of memory;
    selectively assigning the unique virtual platform key to individually secure each corresponding partition of memory; and
    signing each unique virtual platform key with the platform key.
12. The method of claim 11, further comprising:
    generating subsequent unlock keys to secure at least one database stored in the at least one partition of memory, wherein at least a portion of the unlock keys is formed using a derivative of the virtual platform key.
13. An information handling system (IHS) comprising:
    a processor;
    a hypervisor;
    a service processor having at least one partition of memory;
    a memory system communicatively coupled to the hypervisor and having stored thereon a secure boot utility that executes on the processor to enable the hypervisor to:
       detect, at a hypervisor boot emulator, a request for a virtual machine of a plurality of virtual machines to access the service processor;
       in response to detection of the request, triggering a handshake request between the hypervisor boot emulator and the service processor to initiate a sequence of authentication steps to access a corresponding secure partition of memory from among a plurality of secure partitions of memory associated with the service processor, each secure partition of memory having a corresponding virtual platform key for preserving secure access to the corresponding secure partition of memory stored in a secure platform associated with the service processor; and
       dynamically generate unlock keys, following authentication of a boot signature of the virtual machine, the unlock keys generated to authenticate a requesting virtual machine as a valid virtual machine to obtain access to a corresponding secure partition of memory.
14. The IHS of claim 13, wherein the secure boot utility further executes on the processor to enable the hypervisor to:
    in response to the requesting virtual machine successfully providing a corresponding unlock key to the hypervisor boot emulator and obtaining validation at each of the sequence of authentication steps, provide access to the corresponding secure partition of memory; and
    deny access by the requesting virtual machine to the plurality of secure partitions of memory in response to invalidation of the unlock key at any one of the sequence of authentication steps.
15. The IHS of claim 13, wherein the secure boot utility further executes on the processor to enable the hypervisor to:
    in response to detection of the handshake request, receiving the boot signature from the virtual machine;
    compare the boot signature to at least one secure signature of a plurality of secure signatures stored in a valid signature database;
    in response to the boot signature matching a secure signature, dynamically generate a valid unlock key; and
    assign the valid unlock key to the valid virtual machine.

16. The IHS of claim 15, wherein the secure boot utility further executes on the processor to enable the hypervisor to:
store the valid unlock key in the valid signature database, the valid unlock key being one of a mixed set of keys, a unique signature, and a hash of a virtual machine boot signature.

17. The IHS of claim 13, wherein the secure boot utility further executes on the processor to enable the hypervisor to:
assign a corresponding runtime service client interface to the hypervisor boot emulator in communication with the requesting virtual machine;
receive, at the corresponding runtime service client interface, an unlock key;
compare at least a portion of the unlock key to the corresponding virtual platform key;
in response to determining that at least the portion of the unlock key corresponds to the corresponding virtual platform key, dynamically generate a valid session identification that assigns the requesting virtual machine to the corresponding runtime service client interface; and
store the valid session identification on a valid signature database.

18. The IHS of claim 17, wherein the secure boot utility further executes on the processor to enable the hypervisor to:
detect the valid session identification, at the requesting virtual machine, during a subsequent request to access the service processor; and
dynamically authenticate an assignment of the requesting virtual machine to the corresponding runtime service client interface.

19. The IHS of claim 13, wherein the secure boot utility further executes on the processor to enable the hypervisor to:
receive a session identification at the hypervisor boot emulator in response to a virtual machine operating system boot request;
compare at least a select portion of the session identification to a valid session identification stored in the valid signature database;
in response to at least the select portion of the session identification being associated with the valid session identification, receive a signed certificate from the hypervisor boot emulator;
compare the received signed certificate to at least one valid signed certificate stored in a valid signed certificate database associated with the corresponding secure partition of memory; and
enable secure boot with access to the corresponding secure partition of memory in response to the signed certificate matching the at least one valid signed certificate.

20. The IHS of claim 13, wherein the secure boot utility further executes on the processor to enable the hypervisor to:
implement one of a runtime service and a hypercall to initiate the sequence of authentication steps to access the corresponding secure partition of memory, wherein the runtime service and the hypercall are each a Unified Extensible Firmware Interface (UEFI) runtime service established in a hypervisor that forms an association between a platform key and each of the corresponding virtual platform keys;
sign each of the corresponding virtual platform keys with the platform key, wherein the platform key secures the platform storing the secure partitions of memory; and
store at least a portion of the virtual platform key in the valid signature database.

\* \* \* \* \*